(12) United States Patent
Lim et al.

(10) Patent No.: US 10,224,033 B1
(45) Date of Patent: *Mar. 5, 2019

(54) ASSOCIATING A USER VOICE QUERY WITH HEAD DIRECTION

(71) Applicant: MOTOROLA SOLUTIONS, INC, Chicago, IL (US)

(72) Inventors: Bing Qin Lim, Jelutong (MY); Lui Loon Stephen Kuan, Teluk Kumbar (MY)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,235

(22) Filed: Sep. 5, 2017

(51) Int. Cl.
| H04R 1/40 | (2006.01) |
| H04R 3/12 | (2006.01) |
| G10L 15/22 | (2006.01) |
| G10L 15/25 | (2013.01) |

(52) U.S. Cl.
CPC .............. *G10L 15/22* (2013.01); *G10L 15/25* (2013.01); *H04R 1/403* (2013.01); *H04R 1/406* (2013.01); *H04R 3/12* (2013.01); *G10L 2015/227* (2013.01); *H04R 2430/01* (2013.01)

(58) Field of Classification Search
None
See application file for complete search history.

(56) References Cited

U.S. PATENT DOCUMENTS

| 5,859,642 | A * | 1/1999 | Jones ..................... G06F 3/011 345/156 |
| 7,363,398 | B2 * | 4/2008 | Scott ..................... G06F 3/038 340/5.5 |
| 7,843,429 | B2 | 11/2010 | Pryor |
| 7,953,236 | B2 | 5/2011 | Vronay |
| 8,422,693 | B1 * | 4/2013 | Daily ..................... H04R 5/02 381/86 |
| 9,232,366 | B1 | 1/2016 | Charlier et al. |
| 9,282,196 | B1 * | 3/2016 | Norris ............... H04M 1/72572 |
| 9,884,583 | B2 * | 2/2018 | Trinh ..................... G06F 3/167 |
| 10,110,999 | B1 * | 10/2018 | Lim ................ G06F 17/30528 |
| 2011/0096941 | A1 | 4/2011 | Marzetta et al. |
| 2013/0238326 | A1 * | 9/2013 | Kim ..................... G06F 3/167 704/231 |

(Continued)

FOREIGN PATENT DOCUMENTS

EP  3179474 A1  6/2017

OTHER PUBLICATIONS

Bronkhorst, Adelbert W., et al.: "Application of a Three-Dimensional Auditory Display in a Flight Task", Human Factors, vol. 38, No. 1, Mar. 1996, all pages.
Wikipedia, 3D audio effect, https://en.m.wikipedia.org/wiki/3D_audio_effect?wprov=sfla, downloaded from internet: Aug. 28, 2017.
The International Search Report and the Written Opinion corresponding serial No. PCT/US2018/047413 filed Nov. 12, 2018, dated Nov. 12, 2018, all pages.

Primary Examiner — Fariba Sirjani (57) ABSTRACT

A method and apparatus for associating a query to a direction is provided herein. During operation, a virtual partner will attempt to determine a direction the query originated from. When answering the query, the virtual partner will adjust multiple speaker outputs so that the reply is perceived to come from the same direction as the query originated from. Additionally, if another follow-on query is made from a particular direction, the follow-on query will be associated with the prior query originating from the same particular direction.

11 Claims, 8 Drawing Sheets

(56) References Cited

U.S. PATENT DOCUMENTS

| | | | |
|---|---|---|---|
| 2015/0169336 A1* | 6/2015 | Harper | G10L 15/22 |
| | | | 715/706 |
| 2015/0296351 A1 | 10/2015 | Tham et al. | |
| 2015/0331490 A1* | 11/2015 | Yamada | G06F 3/017 |
| | | | 345/156 |
| 2016/0260431 A1* | 9/2016 | Newendorp | G10L 15/32 |
| 2017/0076720 A1* | 3/2017 | Gopalan | G06F 3/167 |
| 2017/0160813 A1* | 6/2017 | Divakaran | G06F 3/017 |
| 2018/0014140 A1* | 1/2018 | Milevski | H04S 7/304 |
| 2018/0109901 A1* | 4/2018 | Laaksonen | G06F 3/012 |
| 2018/0206055 A1* | 7/2018 | Di Censo | H04R 3/12 |
| 2018/0232563 A1* | 8/2018 | Albadawi | G06K 9/726 |

* cited by examiner

ASSOCIATING A USER VOICE QUERY WITH HEAD DIRECTION

CROSS REFERENCE TO RELATED APPLICATIONS

The present application is related to U.S. application Ser. No. 15/695,273, entitled ASSOCIATING A USER VOICE QUERY WITH HEAD DIRECTION, filed on the same date as the present application.

BACKGROUND OF THE INVENTION

Tablets, laptops, phones (e.g., cellular or satellite), mobile (vehicular) or portable (personal) two-way radios, and other communication devices are now in common use by users, such as first responders (including firemen, police officers, and paramedics, among others), and provide such users and others with instant access to increasingly valuable additional information and resources such as vehicle histories, arrest records, outstanding warrants, health information, real-time traffic or other situational status information, and any other information that may aid the user in making a more informed determination of an action to take or how to resolve a situation, among other possibilities.

Many such communication devices further comprise, or provide access to, electronic digital assistants (or sometimes referenced as "virtual partners") that may provide the user thereof with valuable information in an automated (e.g., without further user input) and/or semi-automated (e.g., with some further user input) fashion. The valuable information provided to the user may be based on explicit requests for such information posed by the user via an input (e.g., such as a parsed natural language input or an electronic touch interface manipulation associated with an explicit request) in which the electronic digital assistant may reactively provide such requested valuable information, or may be based on some other set of one or more context or triggers in which the electronic digital assistant may proactively provide such valuable information to the user absent any explicit request from the user.

As some existing examples, electronic digital assistants such as Sid provided by Apple, Inc.® and Google Now provided by Google, Inc.®, are software applications running on underlying electronic hardware that are capable of understanding natural language, and may complete electronic tasks in response to user voice inputs, among other additional or alternative types of inputs. These electronic digital assistants may perform such tasks as taking and storing voice dictation for future reference and retrieval, reading a received text message or an e-mail message aloud, generating a text message or e-mail message reply, looking up requested phone numbers and initiating a phone call to a requested contact, generating calendar appointments and providing appointment reminders, instructing users how to proceed with an assigned task, warning users of nearby dangers such as traffic accidents or environmental hazards, and providing many other types of information in a reactive or proactive manner.

Oftentimes a user may ask multiple queries to their digital assistant in a short period of time. The queries may be independent from each other (different questions) or may be related to a prior query. After receiving a query, a virtual partner takes time to process the query, search through a potential massive public safety database, and construct natural language to response to the user. If, before the virtual partner responds to a query, a user sends a subsequent second or third query, the user might get confused as to whether a response/answer is to the first, second or third query, since the answer to the second or third query may come prior to the answer to the first query.

Furthermore, if the user wants to append to, or amend a particular query (e.g. ask a further follow-up question related to the particular query), there is no technique to accomplish that except for the user to at least repeating subject matter of the particular query. For example, if one asks "Where is my car parked?", and then asks, "What is the high temperature going to be today?", the person will get two responses from their virtual partner. For example, the person may get an answer, "spot 213", and an answer "25 degrees". The person then wants to ask a follow up question "In Chicago?". But what query does it attach to? Is the person asking "is my car parked in Chicago?" or is the person asking "Is the high temperature for Chicago?" Currently, digital assistants have no way of knowing what query the follow-up question applies to.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required.

DETAILED DESCRIPTION

In order to address the above-mentioned need, a method and apparatus for associating a query to a direction is provided herein. During operation, a virtual partner will determine a direction the query originated from. When answering the query, the virtual partner will adjust multiple speaker outputs so that the reply is perceived to come from the same direction as the query originated from. Additionally, if another follow-on query is made from a particular direction, the follow-on query will be associated with a prior query originating from the same particular direction.

Expanding on the above, assume multiple queries are made by an individual. The first query is made when the user turns to the left. In response, the virtual partner will answer the query as if the answer originated from the user's left. A second query is made from the user's right. In response, the virtual partner will answer the query as if the answer originated from the user's right. If the user again turns to the left to query the virtual partner, the query may be associated with the previous query made from the left. It should be noted that two directions (left and right) are used in the above example but multiple directions or head angles (for example, front side of the user, 45 degree angle from the right, 60 degree angle from the left) may be used to handle multiple queries or multiple follow up queries.

Continuing with the above example, if a person asks "where is my car parked" while looking to their right, and then asks, "what is the high temperature going to be today" while looking to their left, they will get two answers. The person may get an answer "spot 213" with virtual partner's voice perceived from their right, and get a second answer "25 degrees" with virtual partner's voice perceived from their left. The person then wants to ask a follow up question "In Chicago?". But what query does it attach to? Is the person asking "Is my car parked in Chicago" or "Is the high temperature for Chicago"? In order to address this issue, a follow up question is associated with a prior query based on the direction the person's head is pointing, so that if the person looks to their right and asks, "In Chicago?", they will get a follow-up answer to the original question asked from the right, "Yes, at the Addison Station in Chicago", with virtual partner's voice perceived from the same right direction, however, if the person asks the same question "In Chicago?" while looking to their left, then the follow-up answer could be "Yes, 25 degrees for a high in Chicago", with virtual partner's voice perceived from the same left direction.

By conveying the response to the user in the same direction as the user performed the query, the user will have an experience as if the virtual partner is virtually located in the direction of the question and will dearly relate different virtual partner responses with the particular query.

In a further embodiment of the present invention, each direction may be associated with a differing persona (different voice and voice characteristics such as, but not limited to, gender, tone, cadence, timbre, phonation, resonance, . . . , etc.).

So, for example, a female may answer from a person's right, and a male may answer from a person's left.

Figure 1:
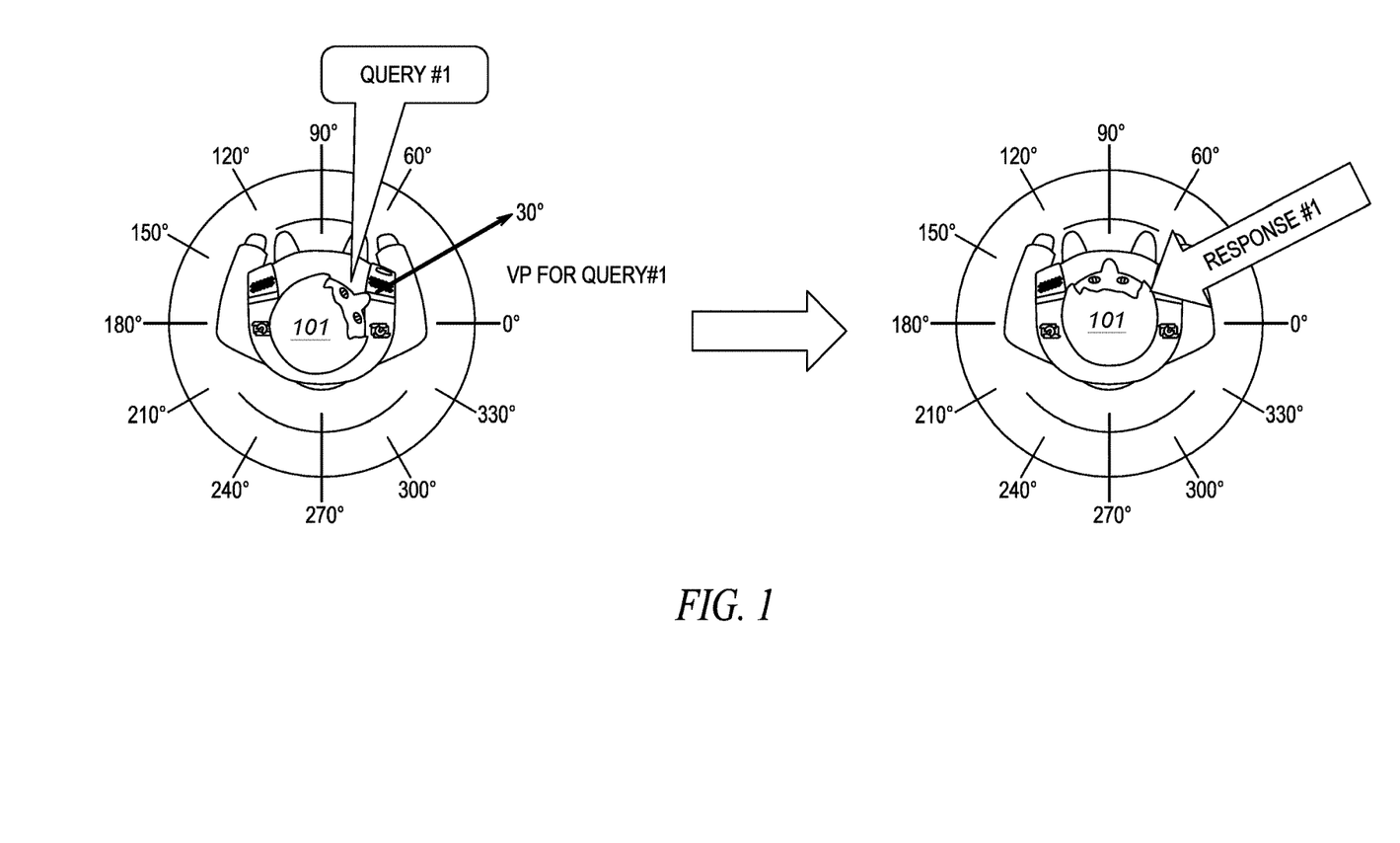
FIG. 1 illustrates an operational environment for the present invention.

Turning now to the drawings, wherein like numerals designate like components, FIG. 1 illustrates an operational environment for the present invention. Person 101 will have a device equipped with a virtual partner. The virtual partner will obtain information on, for example, head direction when a question is asked. In FIG. 1, person 101 asks a question (query #1) when looking off to their right. In this particular example, person 101 is looking 30 degrees to their right when the question was asked. When answering the question, the virtual partner will modify the output of multiple speakers so that the answer of the question will appear to be coming from the person's right side. The modification of the speaker output may be something as simple as having a speaker located on the person's right-hand side output the response (other speakers may remain silent). Alternatively, the phase and amplitude of multiple speakers may be modified so that the answer appears to originate from 30 degrees to their right. In this embodiment, the direction of the answer and query is determined relative to the user body and thus will not be impacted by the user body movement. For example, even if the user rotates their body and/or walks to another location after perform the query, the answer to the query will still originate from 30 degrees to the person's right. In other words, the angle used to determine the direction of a query, and the direction of a response is measured from the user's body as a reference point.

Figure 2:
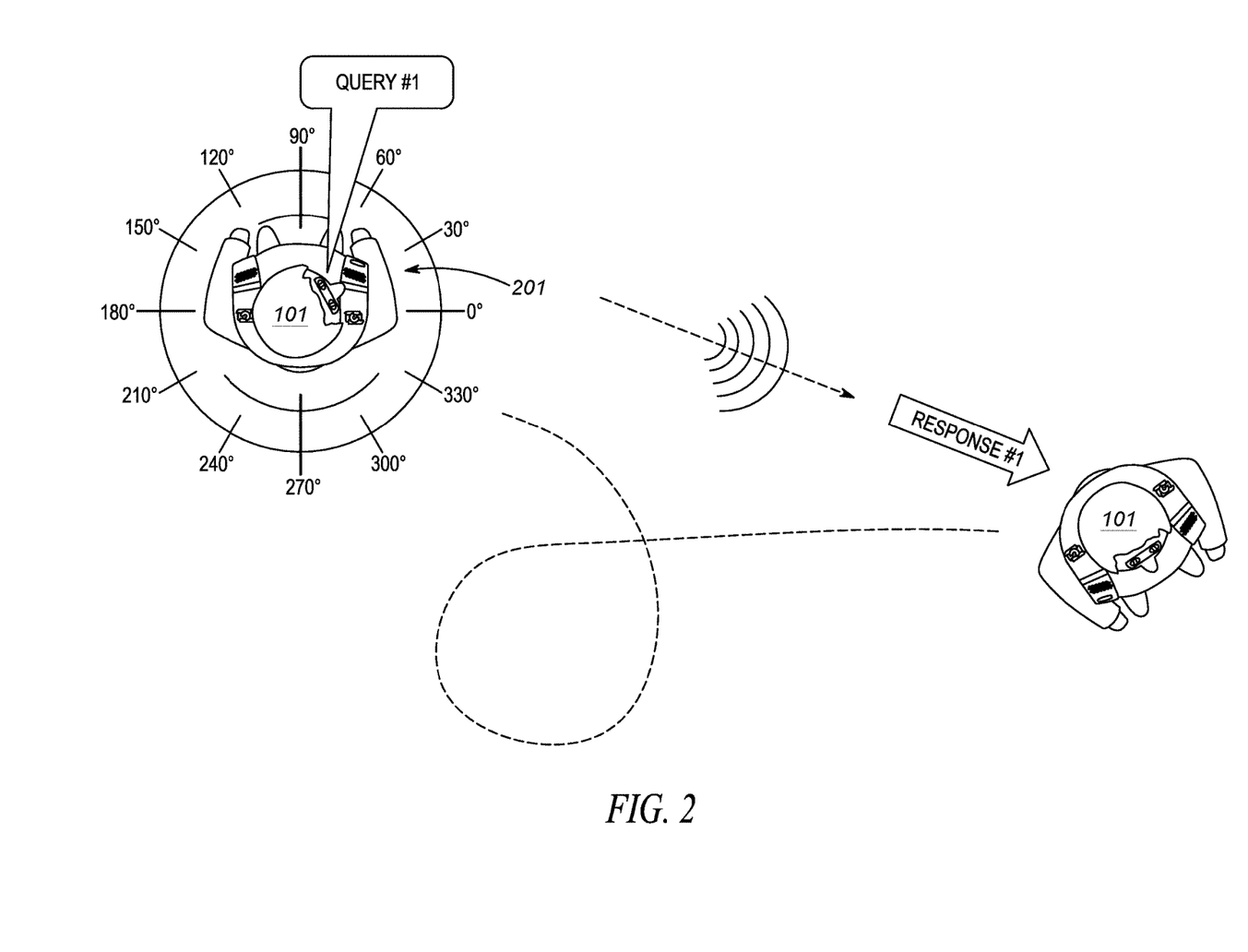
FIG. 2 illustrates an operational environment for the present invention.

Alternatively, as shown in FIG. 2, the virtual partner may determine a location of person 101 when the query was made, and then answer the query as if the answer originated from the user's location when the query was made. More particularly, the virtual partner will determine a location where a person was when a query was made, then determine an answer to the query. Because a period of time may pass between when the question was asked, and when the question was answered, the person may have moved to a new location. Prior to providing the answer to the person, the virtual partner will determine a current location of the person, and determine an orientation of the person. The virtual partner will then adjust speaker parameters so that the answer appears to originate from the location the person was at when they asked the question. The location can be determined by using technique for example GPS, dead reckoning method, motion sensor or other outdoor or indoor location tracking method to determine the absolute or relative location between the location where a query was made and the location where the answer need to be provided. The orientation of the user can be determined by, for example, a motion sensor (e.g. gyroscope, magnetometer).

As discussed above, follow-up questions may be asked to a query. For example, if a query is made to a virtual partner that does not have enough information for the virtual partner to determine an answer, the virtual partner may assume that the query is a follow-up query to a prior query. For example, if a virtual partner received a query, "In Chicago?" from a user, the virtual partner may decide that the query does not contain enough information to formulate an answer. The virtual partner may then associate the query with a prior question/answer. For example, if the prior query was, "What is the high temperature for today?", and the virtual partner answered "25", the virtual partner may determine the query "In Chicago?" to be a follow-up question about the last answer given to the user.

Figure 3:
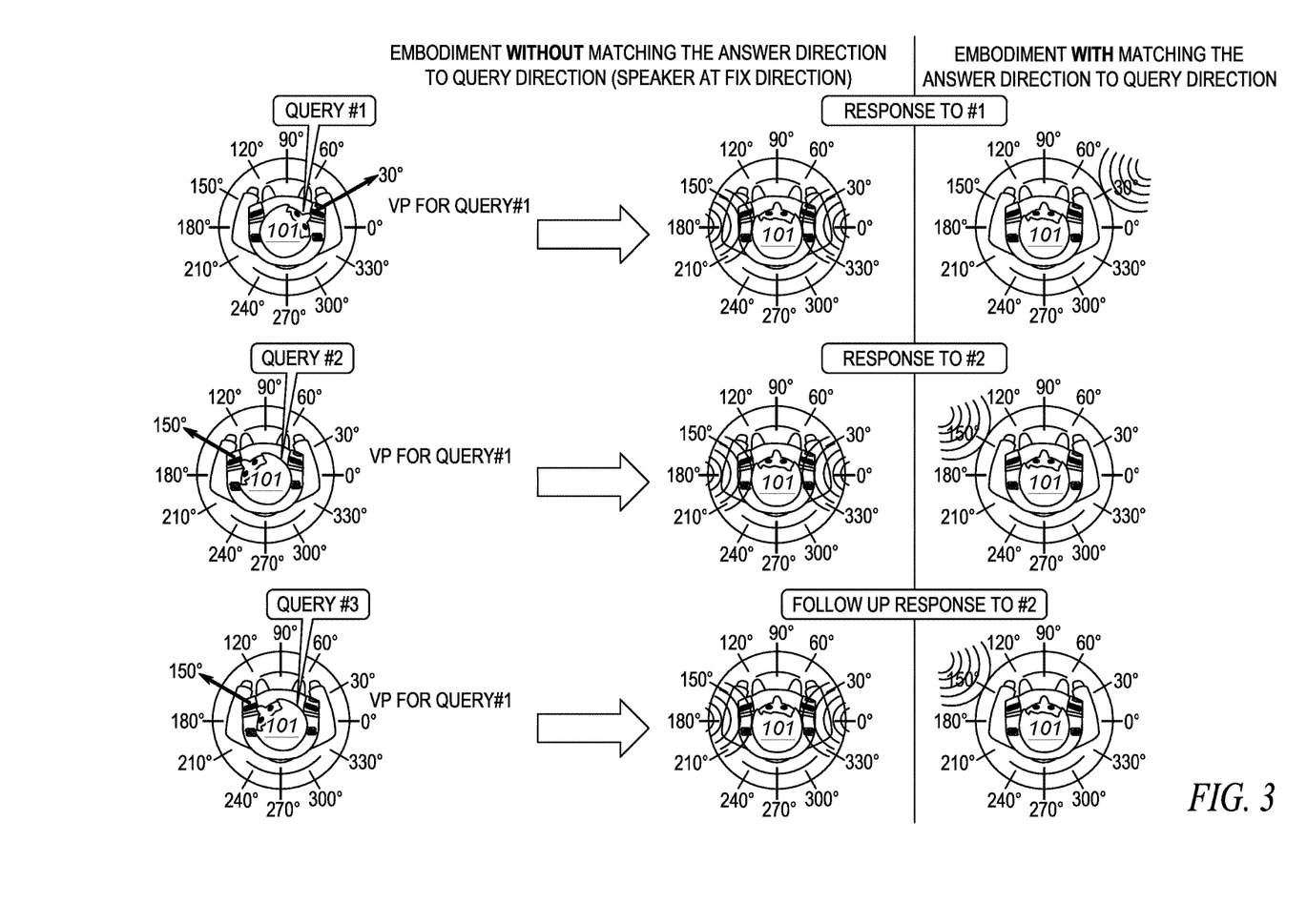
FIG. 3 illustrates an operational environment for the present invention.

As discussed above, when multiple queries are received, the virtual partner may have trouble determining what question and answer a follow-up question is associated with. As shown in FIG. 3, if the virtual partner determines that a query is a follow-up question, it will associate the query with a prior query/prior answer that was provided that originated from a same direction as the follow-up question. In this particular embodiment, the virtual partner may or may not modify speaker outputs (to match the answers direction with queries direction) as discussed above.

As shown in FIG. 3, person 101 asked query #1 when looking to their right, then asked query #2 when looking to their left. Person 101 then asked query #3 while looking to their left. The virtual partner determined that query #3 was a follow-up question because query #3 did not contain enough information to formulate a response. The virtual partner determined that query #3 is a follow-up question to query #2 because query #3 was asked by the user while facing their left. Two embodiments are shown in FIG. 3. In particular, one embodiment (on the left) the direction of the answer does not match the direction of the received query. On the right side of FIG. 3, the virtual partner answer is generated by the speakers so that the virtual partner response (response to initial queries and follow up responses) are perceived from the same direction of the user's head (with respect to the user's body) when the query is made.

Figure 4:
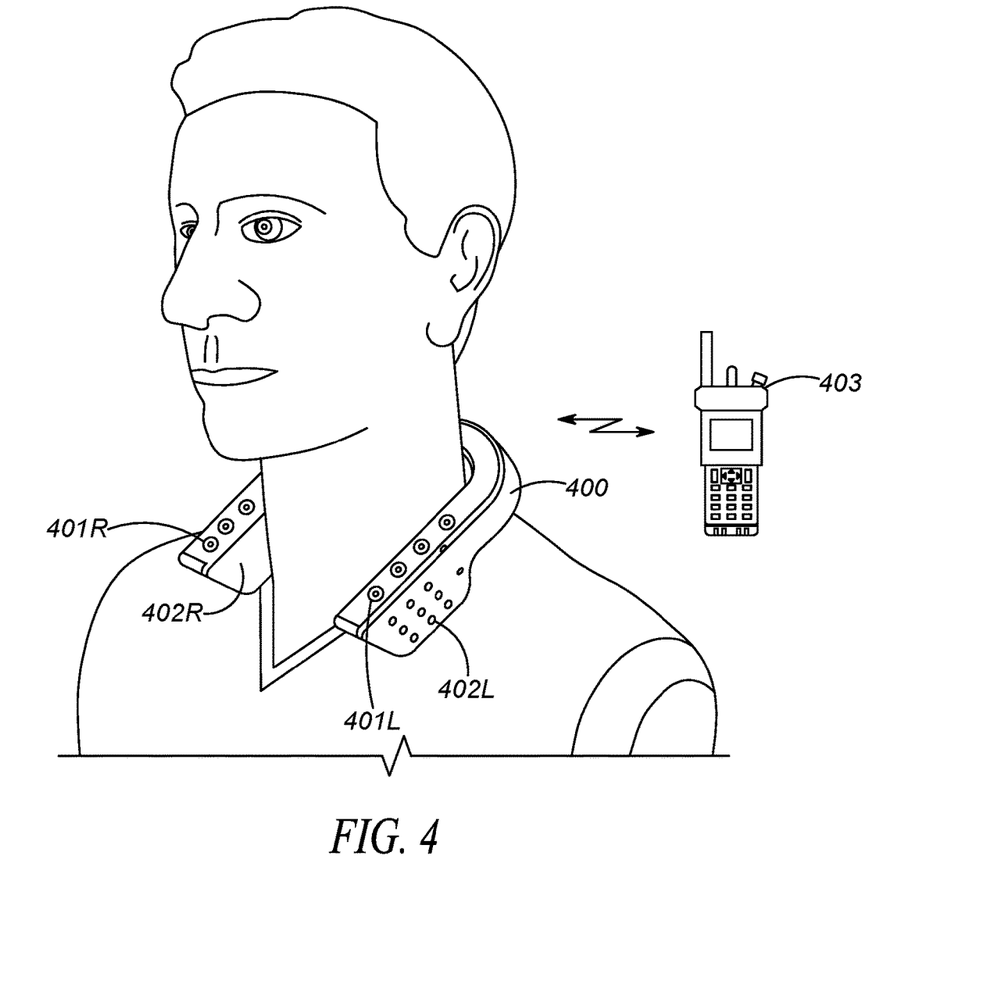
FIG. 4 illustrates a speaker and microphone array in accordance with one embodiment of the present invention.

FIG. 4 shows a system that associates a user's query with a head direction. In this particular embodiment, collar device 400 is used to both determine a user's head direction, and output modified audio as if the output audio originated in a particular direction. It should be noted that device 400 is simply an embodiment of the present invention that determines query direction and provides an audible output that may originate in the direction the user's head was pointed to when they made the query. Device 400 can be replaced with other body wearable devices, for example a wearable harness radio or smart vest that has multiple microphones, speakers and sensors near the location of the user's shoulders. In another example, device 400 can be replaced with other head mounted wearable devices, for example a smart glasses that have multiple microphones, speakers, and sensors located along the temples (arms) of the smart glasses, or a smart helmet that having multiple microphones, speakers, and sensors located inside or outside the helmet.

Hub 403 comprises a police radio equipped with a virtual partner. It is envisioned that the public-safety officer will have an array of devices available to the officer at the beginning of a shift (including collar device 400). The officer will select the devices, and form a personal area network (PAN) with the devices that will accompany the officer on his shift. Collar device 400 pulled by the officer will be configured to be part of a PAN by associating (pairing) with hub 403 and communicating wirelessly to/from hub 403. Hub 403 will be configured with a digital assistant. In a preferred embodiment, the PAN comprises more than two devices, so that many devices are connected via the PAN simultaneously, however, in an alternate embodiment of the present invention only hub 403 and device 400 may be connected via a short-range wireless communication link.

A method called bonding is typically used for recognizing specific devices and thus enabling control over which devices are allowed to connect to each other when forming the PAN. Once bonded, devices then can establish a connection without user intervention. A bond is created through a process called "pairing". The pairing process is typically triggered by a specific request by the user to create a bond from a user via a user interface on the device.

As shown, collar device 400 includes left-side audio speaker 402L, right-side audio speaker 402R, a left-side microphone array 401L, and a right-side microphone array 401R. In this embodiment, the microphone arrays are used as a sensor to determine head direction when a query is received. During operation left and right-side microphone arrays 401L and 401R will receive a query from the user. Microphone arrays 401L and 401R will be used to determine a direction from which the query was received by determining a volume level of the query received at each microphone. The microphone with the largest volume level for the received query will be the direction the user was facing when the query was made.

A head angle can be also be determined by using only two microphones (e.g., one on the user's right and one on the user's left). The direction that the user was facing when the query was made can be determined by comparing the relative loudness differences at each microphone to calculate the user direction, for example, if the audio signal received by the left microphone 401L is 50% louder than the right microphone 401R, then the user facing direction is determined to be 45 degree from the left. In another example, the user head facing direction can be determined by other body-worn sensors that may be located on the user's shoulders (for example, infrared proximity sensor, radar object recognition sensor, radar proximity sensor, capacitive proximity sensor), or sensors that are located on user's head (for example, motion sensor on smart glasses or smart helmet).

Hub 403 will be provided the query and the direction over the short-range communication link (i.e., over the PAN), and hub 403 will formulate a response to the query. The response will be provided to device 400 with volume (and potentially phase) information for each speaker 402L and 402R. The volume information for each speaker may simply be binary (on/off), so that only the speaker 402R is activated when the query originates from the right, and only 402L is activated when the query originates from the left. Alternatively, the gain and phase of each speaker may be adjusted to provide a perception that the answer is originating from any particular angle, for example, as described in U.S. Pat. No. 7,953,236B2, AUDIO USER INTERFACE (UI) FOR PREVIEWING AND SELECTING AUDIO STREAMS USING 3D POSITONAL AUDIO TECHNIQUES, or described by Wikipedia (https://en.m.wikipedia.org/) by searching "3D Audio Effect".

Figure 5:
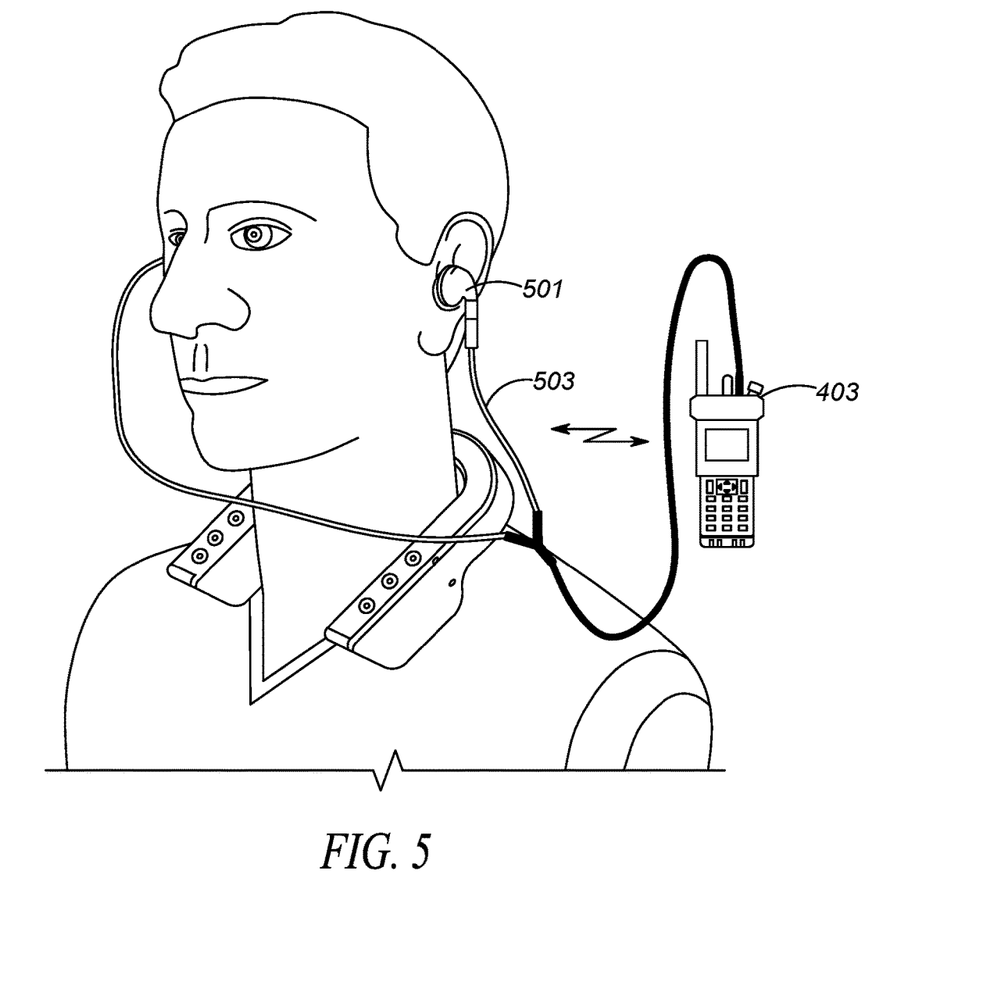
FIG. 5 illustrates a speaker and microphone array in accordance with one embodiment of the present invention.

FIG. 5 shows an alternate embodiment for a system that associates a query with a head direction. In this particular embodiment, ear buds 501 are used to provide the output audio as described above. Although ear buds 501 are shown attached to hub 403 via a wired connection 503, the ear buds may be connected wirelessly via the PAN.

Figure 6:
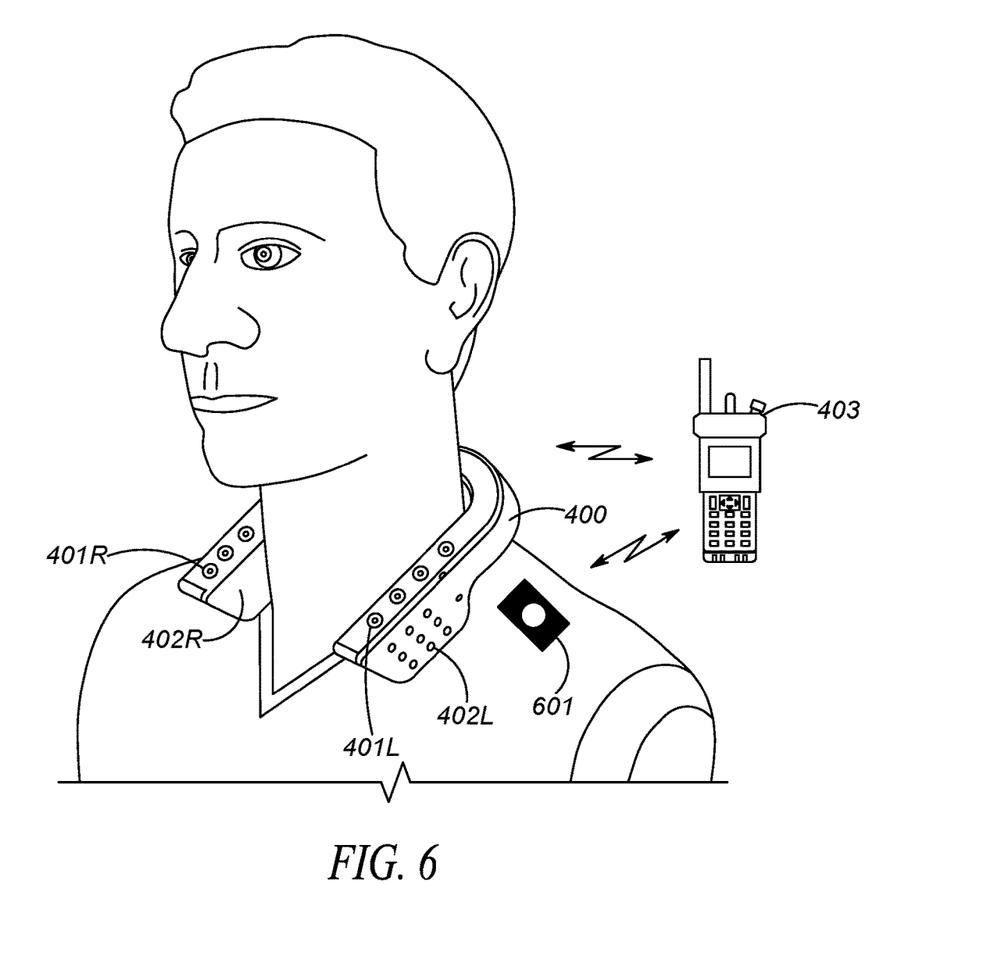
FIG. 6 illustrates a speaker and microphone array in accordance with one embodiment of the present invention.

FIG. 6 shows an alternate embodiment for a system that associates a query with a head direction. In FIG. 6, the microphone array sensor has been replaced by another sensor 601, for example imaging sensor or camera, infrared proximity sensor, radar object recognition sensor, radar proximity sensor. In one example a camera is utilized as sensor 601. Camera 601 is connected wirelessly to hub 403 via the PAN, and is pointed at the user's head. Camera 601 will be used to determine a direction the user's head is pointed when a query is received. A microphone array may still be used to hear the query, however camera 601 will be used to determine where the user's head is pointed when the query is received. More particularly, the camera will capture the user facial features, perform video analytic or object recognition processing, and match or correlate the facial features to a predetermined or pre-calibrated image library that contains images of the user/template face image with different facing angles. In another embodiments, the camera will detect the facial features of, for example the mouth, nose and eyes to determine the user facing direction. For example, in FIG. 6, if the camera detects one eye, the user is facing directly ahead, if two eyes are detected, the user is facing to the left, and no eyes are detected the user is facing the right.

In another example, the angle of the user facing direction can be determined by detecting the nose nostril size and shape, for example, bigger and rounder nose nostril size indicates the user is rotating their head towards the camera and the angle is determined by checking different varying size of the nose nostril. In the example embodiment of using proximity sensor (for example, infrared proximity sensor, radar proximity sensor), two proximity sensors are directed to sense the proximity of the user (one at each side of user's shoulders). In this example, when the user rotates to the left to perform the query, the distance of the user's head to the proximity sensor is changed (chin is now closer to the sensor) and thus the shorter distance detected will indicate the user is turning to towards the sensor.

In another example, radar object recognition can be used to recognize the user facial feature and thus determine user facing direction. In another embodiment, the sensor 601 is a motion sensor (for example, accelerometer, gyrometer, magnetometer) that is located on the head mounted devices (for example, smart glasses, smart helmet). In this example, the motion sensor will move or rotate together with user head and thus able to detect the user facing direction.

Figure 7:
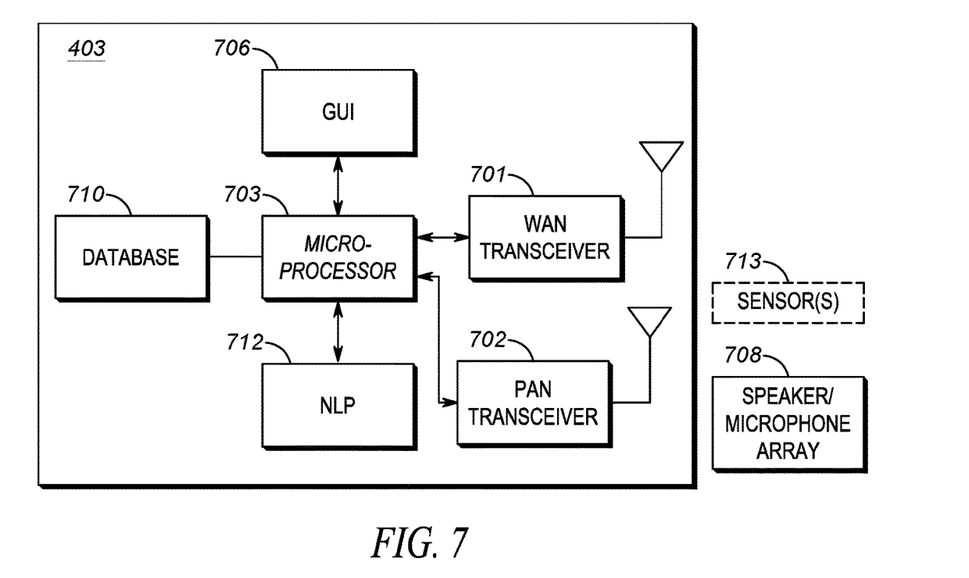
FIG. 7 is a block diagram of a hub.

FIG. 7 is a block diagram of a hub. As shown, hub 403 includes a wide-area-network (WAN) transceiver 701 (e.g., a transceiver that utilizes a public-safety communication-system protocol), PAN transceiver 702 (e.g., a short-range transceiver), Graphical User Interface (GUI) 706, database 710, logic circuitry 703, speaker/microphone array 708 (which may comprise collar radio 400), optional sensors 713, and natural-language processor (NLP) 712. In other implementations, hub 403 may include more, fewer, or different components. For example, if digital-assistant functionality is being provided by cloud services (e.g. a dispatch center), then database 710 and NLP 712 may be absent from hub 403. Also, hub 403 may include an internal speaker (not shown).

WAN transceiver 701 may comprise well known long-range transceivers that utilize any number of network system protocols. (As one of ordinary skill in the art will recognize, a transceiver comprises both a transmitter and a receiver for transmitting and receiving data). For example, WAN transceiver 701 may be configured to utilize a next-generation cellular communications protocol operated by a cellular service provider, or any public-safety protocol such as an APCO 25 network or the FirstNet broadband network. WAN transceiver 701 may also be used to provide the necessary information to any cloud service providing virtual-partner functionality.

PAN transceiver 702 may be well known short-range (e.g., 30 feet of range) transceivers that utilize any number of network system protocols. For example, PAN transceiver 702 may be configured to utilize Bluetooth communication system protocol for a body-area network, or a private 802.11 network. PAN transceiver forms the PAN (acting as a master device) with optional sensors 713 and speaker/microphone 708.

GUI 706 comprises provides a way of displaying information and receiving an input from a user. For example, GUI 706 may provide a way of conveying (e.g., displaying) information to a user regarding that status of device 403.

Speaker/microphone array 708 provides a mechanism for receiving human voice and providing it to the virtual partner (e.g., logic circuitry 703/NLP 712), along with providing audible information generated by the virtual partner (e.g., a voice). Speaker/microphone 708 may receive queries from a user and provide the queries to logic circuitry 703, acting as a digital assistant.

Logic circuitry 703 comprises a digital signal processor (DSP), general purpose microprocessor, a programmable logic device, or application specific integrated circuit (ASIC) and is configured along with NLP 712 to provide digital assistant functionality. Logic circuitry 703 also maps a user's query to a direction, and associates the query with the direction. Logic circuitry 703 also adjusts speaker array 708 to control the volume level of each speaker (and potentially the phase of each speaker) in order to adjust speaker array 708 to provide an output to a query that is perceived by a user to originate from a direction that the query was made from. Logic circuitry 703 also associates follow-up queries to previous queries by determining a head direction in which the follow-up query was made, and associating the follow-up query with a prior query made with the same head direction.

Database 110 is provided. Database 710 comprises standard memory (such as RAM, ROM, . . . , etc) and serves to store queries and their associated head direction.

NLP 712 may be a well known circuitry to analyze, understand, and derive meaning from human language in a smart and useful way. By utilizing NLP, automatic summarization, translation, named entity recognition, relationship extraction, sentiment analysis, speech recognition, and topic segmentation can take place.

The digital assistant (i.e., logic circuitry 703/NLP 712) will determine a direction the query originated from. When answering the query, the virtual partner will adjust multiple speaker outputs so that the reply is perceived to come from the same direction as the query originated from. Additionally, if another follow-on query is made from a particular direction, the follow-on query will be associated with the prior query originating from the same particular direction. In one embodiment of the present invention, the "direction" is an angle the person's head makes with their body, and in another embodiment of the present invention, the "direction" comprises a geographic location the user was at when the query was made.

Figure 8:
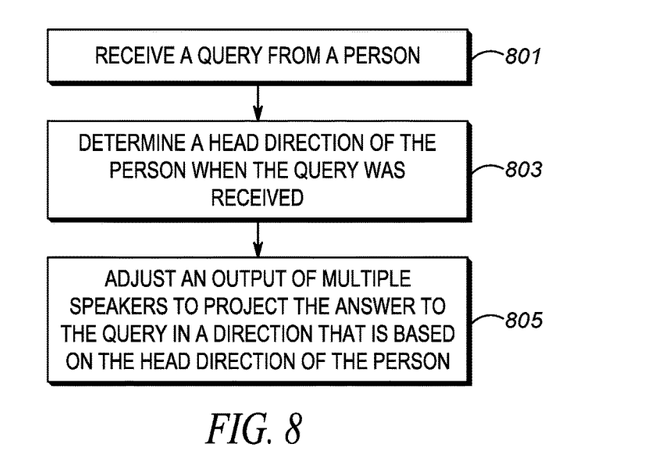
FIG. 8 is a flow chart showing operation of a virtual partner in accordance with a first embodiment of the present invention.

FIG. 8 is a flow chart showing operation of a virtual partner in accordance with a first embodiment of the present invention. In the first embodiment of the present invention, an answer is given to the user by a virtual partner that is perceived to come in the direction where the question originated from. The logic flow begins at step 801 where at least one microphone receives a query from a person. At step 803 a sensor determines a head direction of the person when the query was received. As discussed above, the sensor may be taken from the group consisting of a microphone array, a camera, an infrared proximity sensor, a radar object recognition sensor, a radar proximity sensor, a capacitive proximity sensor, a motion sensor on smart glasses, and a smart helmet. Finally, at step 805, logic circuitry adjusts an output of multiple speakers to project the answer to the query in a direction that is based on the head direction of the person.

As discussed above, the step of adjusting the output of the multiple speakers may comprise the step of adjusting the output of the multiple speakers to project the answer to the query in the head direction of the person when the query was received. Additionally, the step of determining the head direction may comprise the step of determining the head direction with respect to the person's body.

As discussed, the step of adjusting the output of the multiple speakers may comprise the step of adjusting a volume level of the multiple speakers, wherein at least two speakers from the multiple speakers have differing volume levels.

Additionally, as discussed, logic circuitry may determining a persona based on the head direction, and the step of adjusting the output of multiple speakers to project the answer to the query in a direction that is based on the head direction of the person includes the step of adjusting the output of the multiple speakers to answer the query in the persona based on the head direction. More particularly, multiple personas may be stored in database 710, and logic circuitry 703 may map a head direction to a persona, so for example, all questions having an answer perceived from the left of the user will occur in a female voice, while those having an answer perceived from the right of the user will occur in a male voice.

As discussed above, a second query may be received from the person and a second head direction of the person when the second query was received may be determined. The output of multiple speakers will then be adjusted to project the answer to the second query in a second direction that is based on the second head direction of the person. The first and the second head directions may differ.

A third query from a person may be received and a head direction of the person when the third query was received may be determined. It may be determined that the third query is a follow-up question (when not enough information is received from the third query to fully answer a question). Logic circuitry may associate the third query to either the first or the second query based on the head direction of the person when the third query was received.

Figure 9:
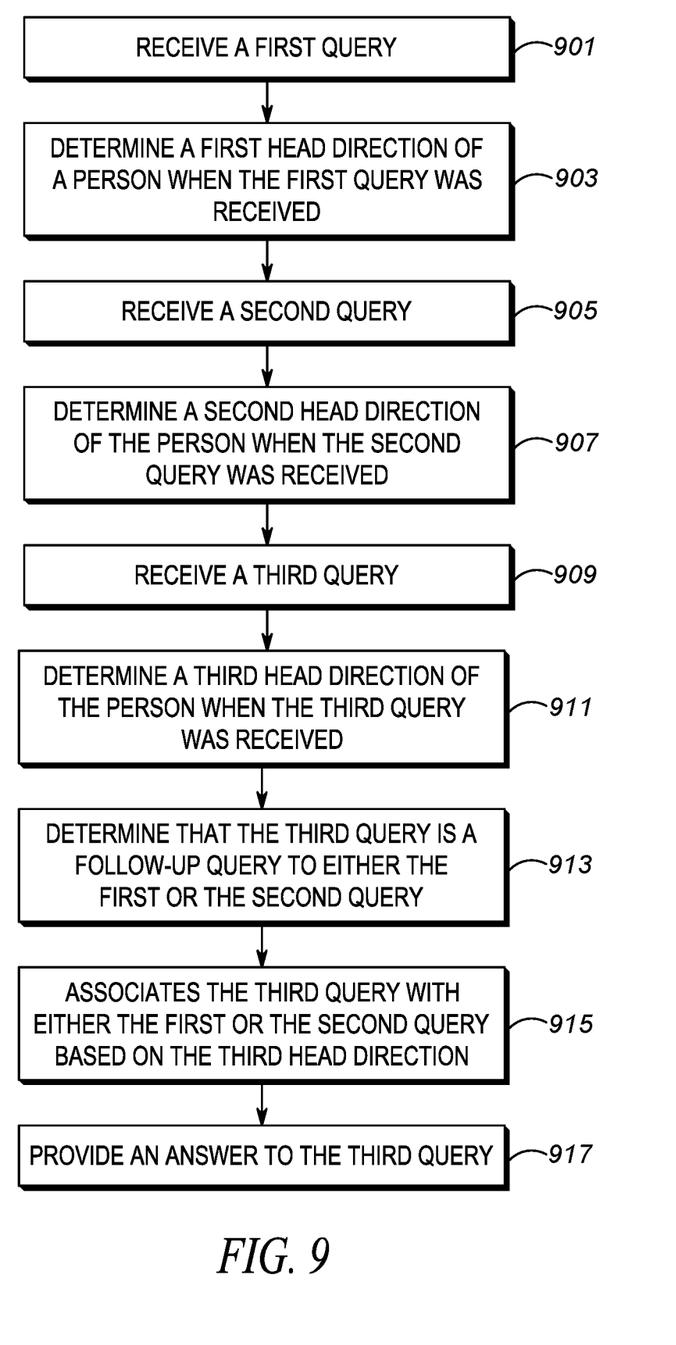
FIG. 9 is a flow chart showing operation of a virtual partner in accordance with a second embodiment of the present invention.

FIG. 9 is a flow chart showing operation of a virtual partner in accordance with a second embodiment of the present invention. In this embodiment, a follow-up question is associated with a prior query based on the head direction associated with the prior query matching the head direction of the follow-up question. The logic flow begins at step 901 where a microphone receives a first query. At step 903 a sensor determines a first head direction of a person when the first query was received. A second query is then received by the microphone (step 905) and a second head direction of the person when the second query was received is determined by logic circuitry (step 907). A third query is then received by the microphone (step 909) and a third head direction of the person when the third query was received is determined by logic circuitry (step 911).

At step 913 logic circuitry 703 determines that the third query is a follow-up query to either the first or the second query and associates the third query with either the first or the second query based on the third head direction (step 915). Finally, logic circuitry 703 provides an answer to the third query to be output via at least one microphone (step 917).

As described above, the step of determining the first, second, and third head directions comprises the step of determining the head directions with respect to the person's body.

Additionally, as described above, an output of multiple speakers may be adjusted to project the answer to the third query in a direction that is based on the third head direction of the person. The step of adjusting the output of the multiple speakers may comprise the step of adjusting a volume level of the multiple speakers, wherein at least two speakers from the multiple speakers have differing volume levels.

Additionally, logic circuitry 703 may determine a persona based on the third head direction and the step of answering the query may comprise the step of answering the query in the persona based on the third head direction.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

Those skilled in the art will further recognize that references to specific implementation embodiments such as "circuitry" may equally be accomplished via either on general purpose computing apparatus (e.g., CPU) or specialized processing apparatus (e.g., DSP) executing software instructions stored in non-transitory computer-readable memory. It will also be understood that the terms and expressions used herein have the ordinary technical meaning as is accorded to such terms and expressions by persons skilled in the technical field as set forth above except where different specific meanings have otherwise been set forth herein.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus for answering a query, the apparatus comprising:
   a microphone receiving a first query from a person and a second query from the person;
   a sensor determining a first head direction of the person with respect to the person's body when the first query was received and determining a second head direction of the person with respect to the person's body when the second query was received; and
   logic circuitry adjusting an output of multiple speakers to project a first answer to the first query and a second answer to the second query such that the first answer appears to originate from a point in space along the first head direction and the second answer appears to originate from a point in space along the second head direction.

2. The apparatus of claim 1 wherein the sensor is taken from the group consisting of a microphone array, a camera, an infrared proximity sensor, a radar object recognition sensor, a radar proximity sensor, a capacitive proximity sensor, a motion sensor on smart glasses, and a smart helmet.

3. The apparatus of claim 1 wherein the logic circuitry adjusts the output of the multiple speakers by adjusting a volume level of the multiple speakers, wherein at least two speakers from the multiple speakers have differing volume levels.

4. The apparatus of claim 1 wherein the logic circuitry determines a persona based on the first head direction adjusts the output of multiple speakers to answer the first query in the persona based on the first head direction.

5. The apparatus of claim 1 wherein the first and the second head directions differ.

6. The apparatus of claim 5 wherein:
   the microphone receives a third query from the person;
   the sensor determines a head direction of the person when the third query was received; and
   the logic circuitry determines that the third query is a follow-up question and associates the third query to either the first or the second query based on the head direction of the person when the third query was received.

7. A method for answering a query, the method comprising the steps of:
   receiving at least one microphone, a first spoken query from a person;
   determining a first head direction of the person with respect to the person's body when the first query was received;
   adjusting an output of multiple speakers to project a first answer to the first query such that the first answer appears to originate from a point in space along the first head direction;
   receiving at the at least one microphone, a second spoken query from the person;
   determining a second head direction of the person with respect to the person's body when the second query was received; and
   adjusting an output of the multiple speakers to project an answer to the second query such that the second answer appears to originate from a point in space along the second head direction.

8. The method of claim 7 wherein the step of adjusting the output of the multiple speakers comprises the step of adjusting a volume level of the multiple speakers, wherein at least two speakers from the multiple speakers have differing volume levels.

9. The method of claim 7 further comprising the step of:
   determining a persona based on the first head direction; and
   wherein the step of adjusting the output of multiple speakers to project the first answer to the query in a direction that is based on the first head direction of the person includes the step of adjusting the output of the multiple speakers to answer the first query in the persona based on the first head direction.

10. The method of claim 9 wherein the first and the second head directions differ.

11. The method of claim 10 further comprising the steps of:
   receiving a third query from the person;
   determining a head direction of the person when the third query was received;
   determining that the third query is a follow-up question; and
   associating the third query to either the first or the second query based on the head direction of the person when the third query was received.

* * * * *